(12) United States Patent
Weiss

(10) Patent No.: US 7,480,931 B2
(45) Date of Patent: Jan. 20, 2009

(54) VOLUME MOUNT AUTHENTICATION

(75) Inventor: Jason Robert Weiss, Katy, TX (US)

(73) Assignee: BBS Technologies, Inc., Houston, TX (US)

( * ) Notice: Subject to any disclaimer, the term of this patent is extended or adjusted under 35 U.S.C. 154(b) by 811 days.

(21) Appl. No.: 10/898,048

(22) Filed: Jul. 24, 2004

(65) Prior Publication Data

US 2006/0020792 A1    Jan. 26, 2006

(51) Int. Cl.
- G06F 7/04 (2006.01)
- G06F 17/30 (2006.01)
- G06K 9/00 (2006.01)
- H04L 9/32 (2006.01)
- H04L 9/00 (2006.01)

(52) U.S. Cl. ............... 726/2; 713/165; 713/167; 713/193; 713/194; 726/16; 726/17; 726/26; 726/27

(58) Field of Classification Search ............ None
See application file for complete search history.

(56) References Cited

U.S. PATENT DOCUMENTS

| | | | |
|---|---|---|---|
| 5,832,213 A | | 11/1998 | Duncan |
| 6,012,145 A | * | 1/2000 | Mathers et al. ............... 726/17 |
| 6,014,746 A | | 1/2000 | Krehnke et al. |
| 6,119,232 A | | 9/2000 | Duncan |
| 6,301,665 B1 | | 10/2001 | Simonich et al. |
| 6,665,714 B1 | | 12/2003 | Blumenau et al. |
| 6,711,685 B1 | | 3/2004 | Schaal et al. |
| 6,904,493 B2 | * | 6/2005 | Chiao et al. ................ 711/103 |
| 7,107,610 B2 | * | 9/2006 | Lortz ............................ 726/4 |
| 7,191,467 B1 | * | 3/2007 | Dujari et al. .................. 726/5 |
| 7,318,150 B2 | * | 1/2008 | Zimmer et al. ................ 713/2 |
| 2002/0083339 A1 | | 6/2002 | Blumenau et al. |
| 2003/0163719 A1 | | 8/2003 | Ebihara |
| 2004/0117318 A1 | * | 6/2004 | Grawrock ................... 705/66 |
| 2005/0015611 A1 | * | 1/2005 | Poisner ...................... 713/200 |

FOREIGN PATENT DOCUMENTS

WO    WO03/107589    12/2003

* cited by examiner

Primary Examiner—Benjamin E Lanier
(74) Attorney, Agent, or Firm—Charles S. Knobloch; Arnold & Knobloch, L.L.P.

(57) ABSTRACT

There is a variety of media that may be inserted into a reading or writing device, such as CD's, USB drives, floppy disks, memory sticks, and many other devices. Media is inserted into a media reading or writing device that is in communication with a computer or network device. Upon insertion of the media, a number of metadata regarding that media is available to the computer. The trustworthy calculator is typically a plug-in software module that processes each piece of volume metadata and applies a weighed score, resulting in a Trustworthy Factor. A scoring matrix denotes ranges of values of the Trustworthy Factor into a Level of Trust Zone. Based on the Level of Trust Zone, appropriate action handlers may direct the computer to disallow the mounting of the media, may require specific authentication action to take place prior to allowing a mount of the media, or may indicate that the media may be mounted without further authentication. Upon completion of the execution of the action handlers, a decision to allow or disallow the mount is made.

37 Claims, 10 Drawing Sheets

VOLUME MOUNT AUTHENTICATION

BACKGROUND

1. Field of the Invention

The present invention relates to the authentication of volume mount points, and in particular the ability of an operating system to selectively accept or reject a volume mount point request for media based on a configurable set of rules.

2. Description of Prior Art

Individuals, corporations and governments face an increasing threat from within. Unethical individuals have at their disposal a multitude of high volume storage mediums available by simply walking into a local electronics store. Anyone can pay several hundred dollars or less to purchase storage devices that are highly resistant to detection. These devices assuredly help simplify the act of corporate and government espionage and greatly facilitate the proliferation of computer viruses, electronic Trojan Horses, and similar objects of computer mass infiltration. Even institutions that employ security checkpoints where backpacks and briefcases are searched and everyone must walk through a metal detector face the daunting challenge of detecting and deterring someone from walking out the front door with 256 MB, 512 MB, 2 GB, 4 GB or more of business intelligence, classified drawings, or sensitive financial documents on a device that is roughly the size of a clasp on a brazier.

Undoubtedly plug-and-play hard drives, palm-sized mobile storage solutions, infrared and radio frequency (RF) over-the-air digital data communications are now pervasive in today's society. As the popularity and number of these types of devices continue to grow, enterprise Information Technology (IT) departments, as well as a growing consumer base, are demanding methods to authenticate and trust certain physical devices while rejecting access to other physically identical devices. Obtaining such authentication and trust has to be accomplished in a way that does not compromise business productivity. To illustrate by example, consider employee A, who steps away from a physically secured laptop computer. Visitor B is able to quickly plug a USB flash drive into the computer. Visitor B may quickly copy trade secrets from the computer to the USB flash drive, or may download a computer virus from the USB flash drive to the computer. Visitor B is able to complete these tasks and remove the USB flash drive prior to employee A's return. Employee A will have little chance to know that business intelligence was taken, nor that a virus was implanted.

BRIEF SUMMARY OF THE INVENTION

The present invention provides a dynamic and expeditious means of authenticating one or more mountable volumes. If the circumstances surrounding the volume undergoing authentication are found to be sufficiently proper, the volume is considered trustworthy and a mounting request is allowed to proceed. If circumstances are found to be outside the range of that considered proper, the mounting request is denied. In the case of a volume already mounted, dismounting action may be taken. The present invention further provides a means of determining whether the found circumstances are proper, that is trustworthy, or not.

The core application, called Volume Trust, relies on a series of fuzzy logic calculations that inspect the attributes (size, number of sectors, drive interface type, et cetera) of a volume, applying weighted calculations to determine a raw score and an overall maximum possible score. This raw score is then mathematically adjusted to be within the range of 0 to 100, resulting in a Trustworthy Factor score for the volume undergoing authentication. The Trustworthy Factor score can be calculated in a completely non-intrusive way, meaning that no data whatsoever has to be written to the volume during this process. As a result, read-only media such as CD-ROM's and DVD's may be assigned unique Trustworthy Factor scores and there is no change in the amount of free space available on read/write volumes after the process completes.

The Trustworthy Factor score is not an absolute threshold. Analogies can be drawn to the popular consumer credit rating system. In that system, the higher the credit score, the less risk there is that the consumer will default on a loan. However, regardless of how high the credit score is, there is always the possibility of the consumer defaulting on the loan. Similarly, as the Trustworthy Factor score increases, the likelihood of the volume containing malignant code or being used for malicious purposes decreases, though the threat is never entirely eradicated. The only true way to eradicate the threat from mobile, external storage devices is to build a computer that has no external ports and is physically secured to ensure new drives can not be inserted. In the course of day-to-day business operations, such a device is impractical and would be a large impediment to business productivity.

By its very nature, a weighted scoring system provides administrators the ability to factor each capability of the volume in a different way. For instance, consider this example that inspects only the disk interface. An IDE hard drive mounted as a fixed disk inside a computer, where the computer case has been secured, might score a Trustworthy Factor score in the mid-sixties and be considered a highly trustable volume, a high level of trust. A 160 GB external IEEE 1394 drive, which resides outside the computer case, might score a Trustworthy Factor score in the low thirties. It may be considered a moderately trustable volume, since there are no pocket-sized or palm-sized drives meeting that description. A 64 MB USB keychain drive might yield a Trustworthy Factor score less than twenty, meaning that it should be considered as untrustworthy and potentially a security threat, a low level of trust.

Typically, over twenty five different factors, called metadata elements, are examined in the computation of a volume's Trustworthy Factor score. Each factor can be given different weighing factors, as appropriate for the organization being served. For example, consider two devices, one that discloses the number of sectors and tracks it contains and another that does not. The device that discloses the number of sectors information is more trustworthy than the device that fails to disclose. Thus, the disclosing device receives a slightly higher Trustworthy Factor score. However, other factors may be more important in determining the trustworthiness of the device. Another factor is the interface type used to interact with the device (IDE, USB, IEEE 1394, et cetera). This factor indicates the portability of the volume. IDE is considered more trustworthy than USB for the simple fact that it is difficult to mount an IDE drive outside the computer case. Thus, an IDE drive mounted inside a locked computer case should be considered to have a high level of trust.

One of the benefits of the present invention is the use of administrator-configured weighing factors to discriminate more important volume factors, metadata elements, from others. This allows the Volume Trust application to be adjusted to local needs without need for recompilation. Increasing the weighing factors directly impacts the trustworthy factor score of a volume that discloses that metadata element. In fact, the Volume Trust application can be tuned in the field in a matter of seconds to respond to the circumstances at hand. For example, a laptop used by an individual at their cubicle on the 37th floor of corporate headquarters is at minimal risk. When that laptop is taken on a business trip to a conference room with 30 strangers at a client's office, the level of risk should increase moderately. Now, when that same laptop is taken to the Comdex tradeshow floor where there are hundreds of thousands of strangers walking around, the maximum level of protection should be enabled and the Volume Trust application should be extremely skeptical about every external storage device.

OBJECTS AND ADVANTAGES

While the present invention may be practiced using software, hardware or firmware, it is an object of the present invention to provide a software based solution to volume mount authentication.

An advantage of the present invention is that it may be cost-effectively deployed to a large installation base through common software distribution techniques and does not require technicians to manipulate computer hardware.

The present invention is backwards compatible, easily working with existing computer infrastructure.

The present invention is operating system independent.

The present invention is independent of programming language.

The present invention allows a storage device, such as a DVD or CD-ROM drive, or card reader, to remain online while scrutinizing the media associated with the storage device.

The present invention does not require the modification of existing user security privileges, nor does it require the creation or modification of specialized security privilege groups.

The present invention operates in real-time by leveraging the event notification mechanisms built into most operating systems.

The present invention does not rely on cryptographic algorithms susceptible to aging, which become insecure over time, nor does it rely on expensive and administratively time-consuming Public Key Identification (PKI).

The present invention does not require any modification of existing computer or computer-peripheral manufacturing techniques.

The present invention allows an administrator or user to refine the fuzzy logic used to establish trust between the device and media without requiring access to source code and redistributing new binary run-time objects.

The present invention allows for easy audit and logging of external storage device interactions through its robust and flexible daisy-chained list of zone action handlers.

The present invention works on virtually all devices that contain a microprocessor, from computers to phones to personal digital assistants across operating systems and programming languages.

The present invention provides the ability to slide the level of trust based upon external security factors, such as different states of terrorist alerts.

BRIEF DESCRIPTION OF THE SEVERAL VIEWS OF THE DRAWING

The present invention and its advantages will be better understood by referring to the following detailed description and the attached drawings in which.

REFERENCE NUMERALS

Figure 1:
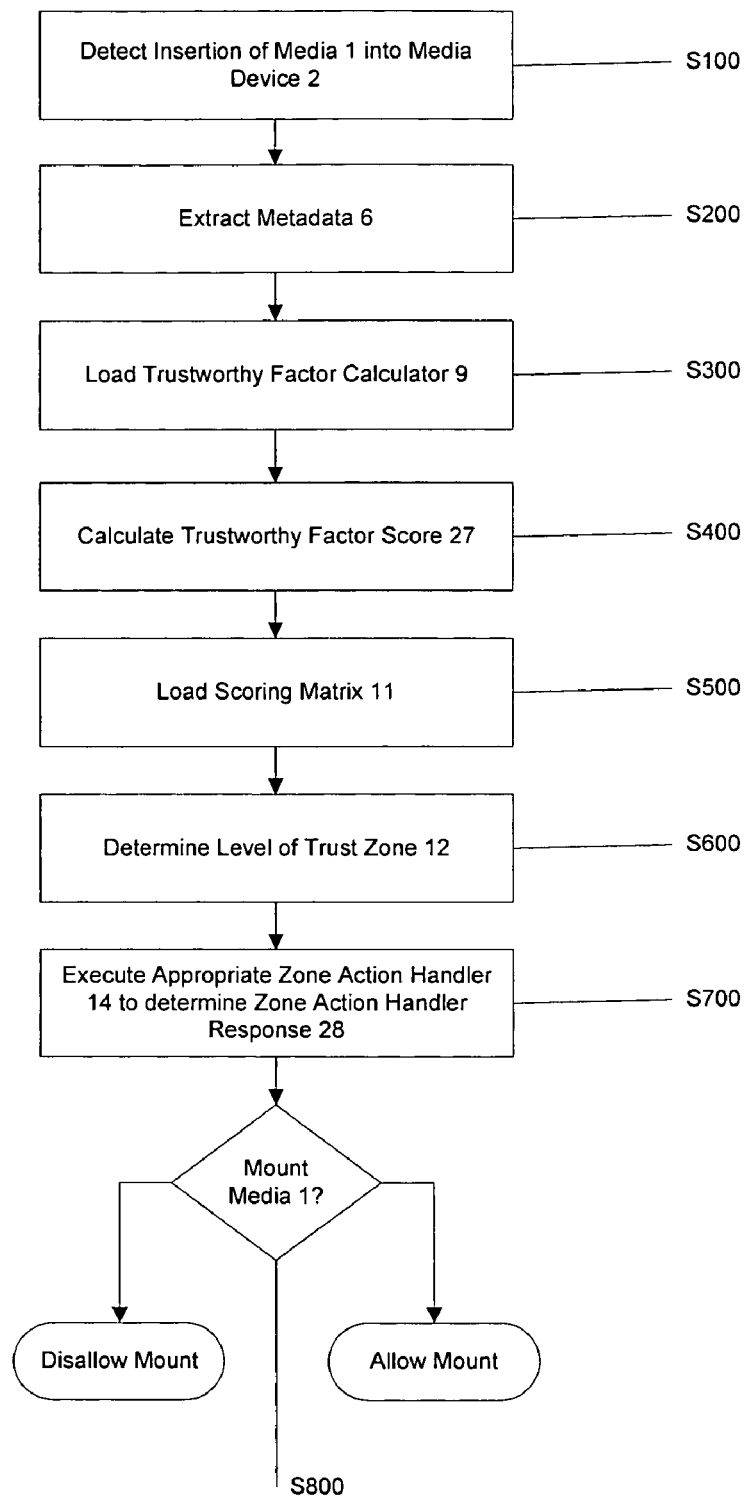
FIG. 1 is a an overall flow-chart view of the basic process steps of the volume mount authentication process, S100 through S800.

1 Media
2 Media device
3 Computing device
4 Computer
5 Volume mount point
6 Metadata
7 Metadata object
8 Metadata element
9 Trustworthy factor calculator
10 Raw score
11 Scoring matrix
12 Level of trust zone
13 Action handler
14 Zone action handler
15 Progress bar
16 Volume mount notification
17 Logical disk information
18 Physical disk partition address
19 Physical storage device address
20 Data communication channels
21 Media computing devices
22 Calculation steps
23 Weighing factors
24 Score value
25 Maximum possible score value
26 Overall maximum score
27 Trustworthy factor score
28 Ultimate signal
29 Thread
30 Alternate calculation steps
31 Alternate scoring matrix
32 Remote location
33 Remember Media action handler
34 Media Previously Trusted action handler
35 External security level
36 Data structures
37 Matrix of numerical scores
38 Matrix of weighing factors
39 Zone action handler response
40 volume mount point icon
50 Volume Trust (application)
S100 Detect Insertion of Media
   S110 User Logs onto Computer
   S120 Automatically Start Application S130 Identify Existing Mount Points
S140 Wait for Media Notification
S150 User Inserts External Storage Device with Media
S160 Spawn a Thread
S170 Display Progress Bar
S200 Extract Media Metadata
   S210 Convert Logical Disk to Partition
   S220 Convert Partition to Physical Drive
   S230 Fetch Storage Device Data
   S240 Fetch Logical Disk Data
   S250 Fetch Disk Partition Data
   S260 Fetch Physical Media Data
   S270 Fetch Data Channel Data
   S280 Fetch Media Device Data
S300 Load Trustworthy Factor Calculator
   S310 Identify Location
   S320 Lookup Trustworthy Factor for Identified Location
   S330 Load Trustworthy Factor Calculator from Local Computer
   S340 Download Trustworthy Factor Calculator from Remote Location
   S350 Initialize Calculator and Load Weight Factors
S400 Calculate Trustworthy Factor
   S410 Compute Actual and Maximum Possible Score
   S420 Calculate Normalized Trustworthy Factor
S500 Load Scoring Matrix
   S510 Identify Location
   S520 Lookup Scoring Matrix for Identified Location
S600 Determine Level of Trust Zone
S700 Execute Appropriate Zone Action Handlers
   S705 Check if Media Previously Trusted
   S710 Prompt for Password
   S720 Prompt for Biometric
   S730 Prompt for Security Token Card
   S740 Determine if User Belongs to the Administrator Security Group
   S750 Remember Media Decision
   S760 Always Associate Media with Mount or Dismount Conclusion
   S770 Determine and Track Association with an Expiration Date
S800 Allow—Disallow Mount
   S810 Show Level of Trust Zone

DETAILED DESCRIPTION OF THE INVENTION

An overall flow-chart view of the basic process steps of the volume mount authentication process, S100 through S800, is shown in FIG. 1. There is a wide assortment of media currently available that may be inserted into a media reading or writing device. Examples include, but are not limited to: CD's, USB drives, floppy disks, memory sticks, and many other devices. Media 1 is inserted into a media reading or writing device 2 that is in communication with a computing device 3, such as a computer or network device. Computing device 3 detects insertion of the media, step S100. Upon insertion of media 1, data structures containing metadata 6 related to media 1 becomes available to computing device 3. For example, metadata may include information about the type of media, its cryptographic characteristics including its ID, its actual physical size, the file architecture used (such as "FAT32", "FAT16", et cetera), sector size, et cetera. Metadata 6 is extracted, step S200. If not already available, a trustworthy factor calculator 9 is loaded, step S300. Trustworthy factor calculator 9 is typically a plug-in software module that processes each metadata element and applies a weighed score, resulting in a trustworthy factor score 27, step S400. A scoring matrix 11 is loaded, step S500. Scoring matrix 11 denotes ranges of values of the trustworthy factor score 27 into zones, typically four zones. Scoring matrix 11 is used to convert trustworthy factor score 27 into a zone number, called a Level of Trust Zone 12, step S600. Based on the value of Level of Trust Zone 12, an appropriate Zone Action Handler 14 is selected, step S700. By returning a Zone Action Handler Response 28, Zone Action Handler 14 may direct computing device 3 to disallow the mounting of media 1, may require specific authentication action to take place prior to allowing a mount of media 1, or may indicate that media 1 may be mounted without further authentication. Typically, Zone Action Handler 14 comprises a plurality of action handlers that are executed in succession. Upon completion of execution of Zone Action Handler 14, a decision to allow or disallow the mount is made, step S800.

Furthermore, a media device may be hosted by a second computing device. Such second computing device may abstract the media device from the first computing device. For example, a desktop PC is a first computing device which is performing volume mount authentication on a PDA (a handheld portable computer) that contains a media device such as a hard disk storage drive. The PDA in this example is a second computing device which is hosting the media device. In all cases, the second computing device, or any computing intermediary, is effectively the same as a media device which it is hosting. The meaning of the term media device may include any media device, its host, or other computing intermediary.

Figure 2:
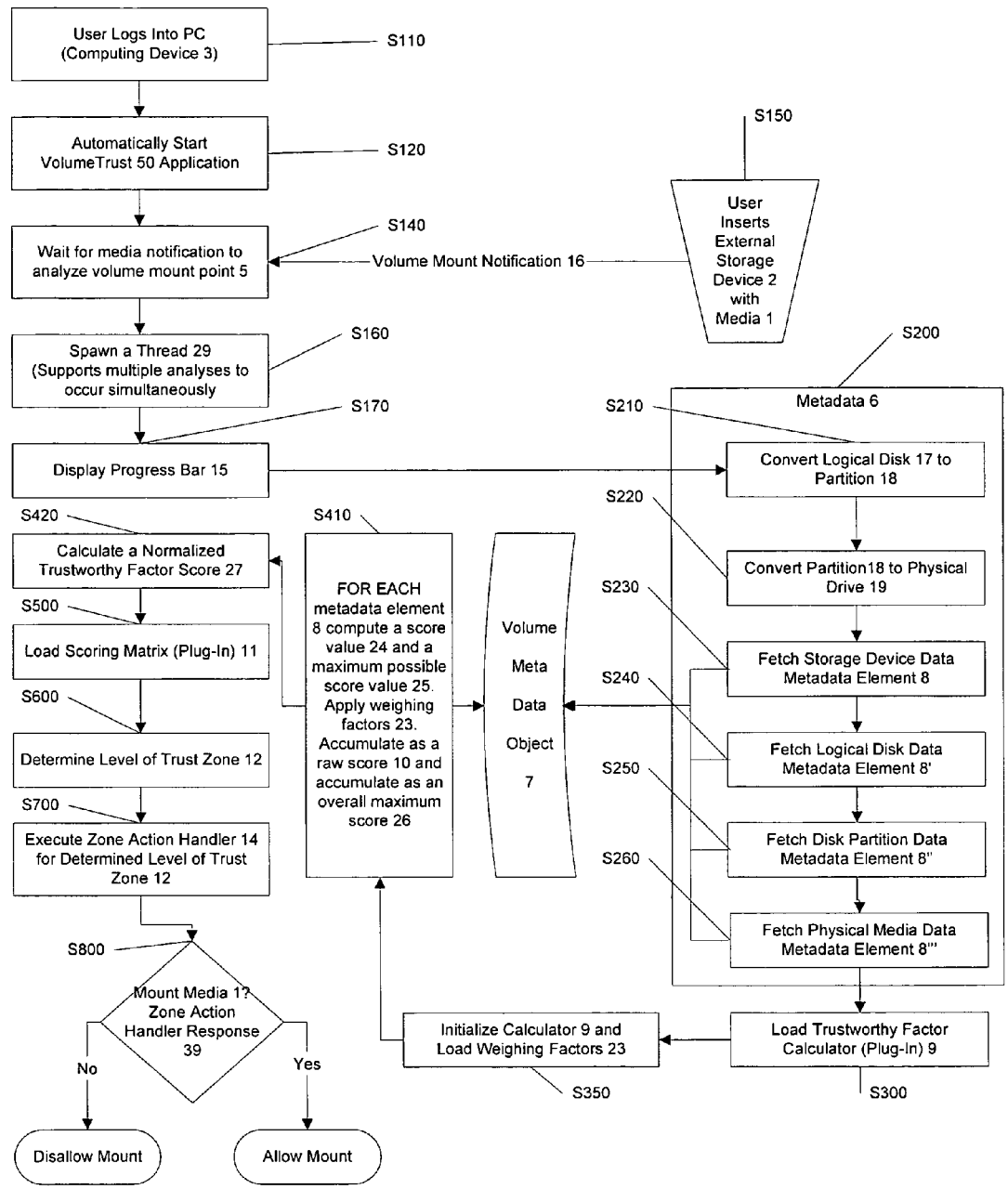
FIG. 2 is a detailed flow-chart view of the core process steps of the volume mount authentication process.

A detailed flow-chart view of the core process steps of the volume mount authentication process is illustrated in FIG. 2. Typically, a user logs into computing device 3, step S110. A personal computer is used for purposes of illustration, but computing device 3 may be any of a myriad of devices either now known or developed in the future. For example, computing device 3 may be a Windows or LINUX based personal computer, a Macintosh, a UNIX machine, a Personal Digital Assistant, a telephone or telephone system, a network controller, server, workstation, digital appliance, computerized test equipment, custom computer, et cetera. Typically, the volume mount authentication application, called Volume Trust 50, is started automatically, step S120. Application Volume Trust 50 polls or waits for notification to analyze a volume mount point 5, step S140. A volume mount point is an abstraction of the memory addresses that reference a device or media capable of being mounted or recognized by the computer. Volume mount points exist for all typical computer devices, especially those holding data, such as hard drives, floppy disks, CD/DVD drives, et cetera. Volume mount points also exist for devices connected by way of infrared and radio signals. Beaming data to a computer by way of an infrared signal creates a volume mount point, as does personal area networks, such as "Blue Tooth", and even radio frequency connections to telephone cell towers. The volume mount point, regardless of the form it takes, establishes the link between the logical connection and the physical connection to a device and its media. When a user inserts an external storage media device 2 with media 1, or media 1 into a connected storage media device 2, step S150, a volume mount notification 16 occurs and is recognized by application Volume Trust 50. Application Volume Trust 50 spawns a thread 29, step S160, to begin the volume trust authentication process. While it is not necessary to spawn a thread in order to practice the present invention, it is of great advantage to use multi-thread techniques. Use of multi-threading allows authentication of a plurality of media while the first media is still undergoing authentication. Optionally, a progress bar 15 is displayed for the user's benefit, step S170.

Volume mount notification 16 must be decoded so metadata 6 that is related to media 1 may be extracted. This is done by first converting the logical disk information 17 into a physical disk partition address 18, step S210. Note, physical disk partition address 18 is commonly known to refer to any block of storage space that may be read from, written to, or is both readable and writable. Physical disk partition address 18 is then converted into a physical storage device address 19, step S220. These steps of deabstracting the information are typically performed using routine libraries, and these steps are well known to those skilled in the art. Once the physical drive information is obtained, the storage device data is extracted, step S230, along with logical disk data, S240, disk partition data, S250, and physical media data, S260, from their respective data structures, as is appropriate for the media being authenticated. Such collected metadata 6 is stored as a volume metadata object 7. Typically, at least two dozen metadata elements 8 describing media 1 and media device 2 are gathered.

One or more data communications channels may exist between the computing device and the media device or media itself. In such cases, it is also possible to collect metadata associated with the data communications channel.

The media may also be associated with one or more media devices, data communications channels, or media computing devices, each of which are abstracted behind the volume mount point. For instance, the computing device under authentication may detect a volume mount point from an infrared signal being sent from a handheld computing device containing a miniature hard disk drive that is plugged into the handheld computing device's USB port. The miniature hard disk drive represents the media device. In such a configuration, the computing device under authentication may retrieve metadata from the infra-communication channel, the handheld computing device itself, its USB data channel, and the miniature hard disk drive.

Trustworthy factor calculator 9 is loaded, step S300. Typically, in a Windows operating system, trustworthy factor calculator 9 is a dynamic linked library, a plug in module. Trustworthy factor calculator 9 looks up and loads calculation steps 22 associated with the metadata elements of interest. Trustworthy factor calculator 9 loads weighing factors 23 which correspond to the metadata elements, step S350. For each metadata element 8, Trustworthy factor calculator 9, using calculation steps 22, determines a score value 24 and its maximum possible score value 25. Weighing factors 23 are applied to each score value 24 and each maximum possible score value 25. Score values 24 are accumulated as a raw score 10 and the maximum possible score values 25 are accumulated as an overall maximum score 26, step S410. Accumulated raw score 10 is normalized, based on overall maximum score 26, step S420, establishing a trustworthy factor score 27. Typically, for convenience, trustworthy factor score 27 is set to create a range of zero (0) to one hundred (100). This is accomplished by simply dividing accumulated raw score 10 by overall maximum score 26 and multiplying by one hundred (100).

Scoring matrix 11 is loaded, step S500. Typically, in a Windows brand operating system, this module is a dynamic linked library, a plug in module. Scoring matrix 11 is a set of established thresholds used to classify resulting Trustworthy Factor Score 27 created the Trustworthy Factor Calculator 9. The zone encompassing Trustworthy Factor Score 27 is identified as the Level of Trust Zone 12, step S600. For example, a trustworthy factor score falling between 0 to 15 may be classed as zone one (1), a trustworthy factor score falling between 16 to 50 as zone two (2), a trustworthy factor score falling between 51 to 80 as zone three (3), and a trustworthy factor score falling between 81 to 100 as zone four (4). Once Level of Trust Zone 12 is identified, the zone information is used to select and execute a Zone Action Handler 14 for that Level of Trust Zone 12, step S700. Continuing the example, a trustworthy factor score of 45 falls between 16 and 50 and is therefore classed as zone two (2). The Zone Action Handler corresponding to that zone two (2) is then executed.

Figure 6:
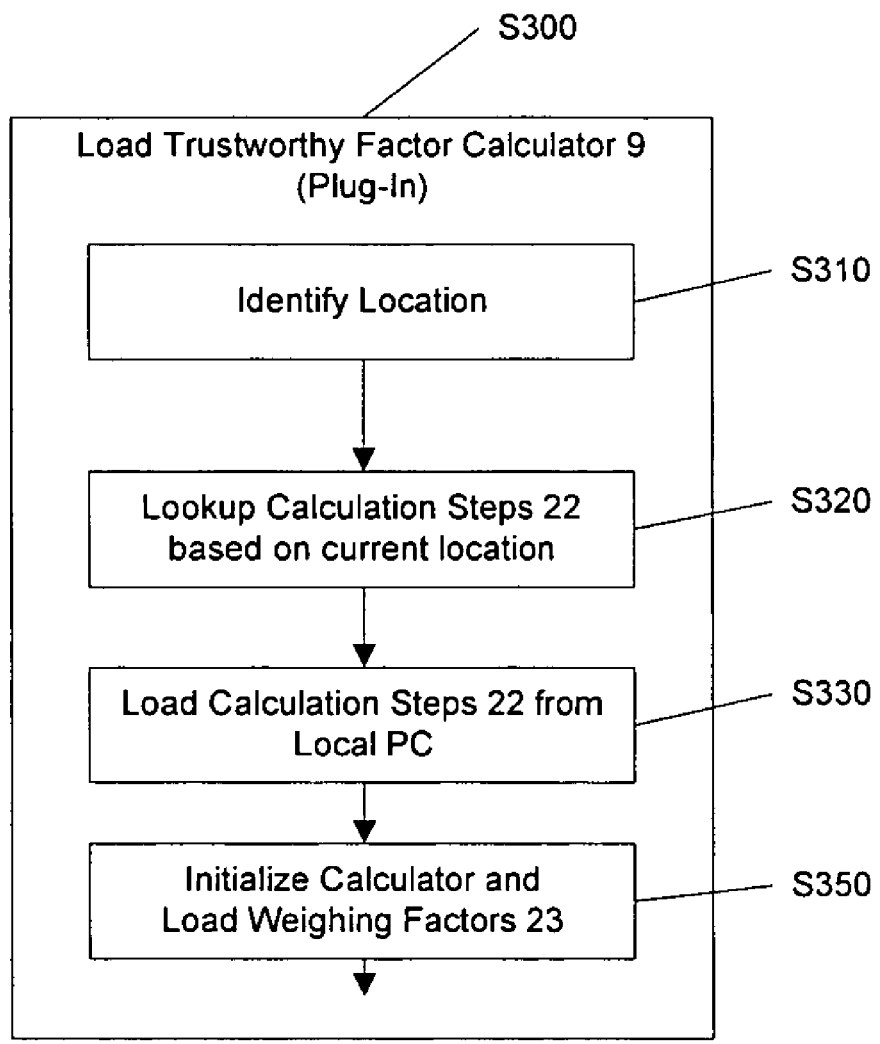
FIG. 6 is a flow-chart view of dynamic adjustment of the calculating steps of the Trustworthy Factor Calculator, based on the perceived location of the computing device.

Zone Action Handler 14 may perform a variety of actions, which will be detailed in FIG. 6.

Zone Action Handler 14 returns an ultimate signal, a Zone Action Handler Response 39, to allow mount of media 1 or disallow mount of media 1, step S800. This concludes the volume mount authentication process.

Figure 3:
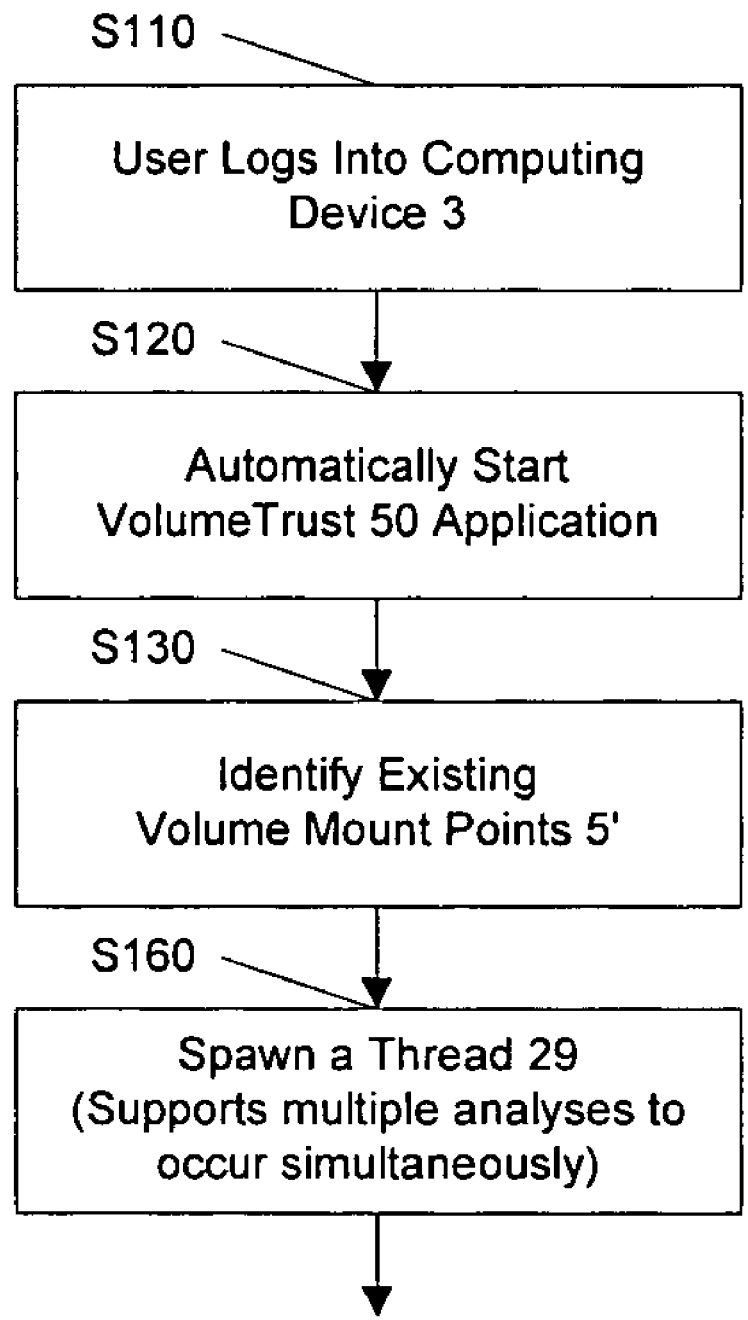
FIG. 3 is a flow-chart view of the boot analysis steps.

FIG. 3 further details the boot analysis steps in the case of authenticating existing volume mount points 5'. Typically, a user logs into computing device 3, step S110. Typically, application Volume Trust 50 is started automatically, step S120. Application Volume Trust 50 polls for existing volume mount points 5' seen by computing device 3, step S140. For each volume mount point 5', application Volume Trust 50 spawns a thread 29, step S160, to begin the volume mount authentication process for each detected volume mount point 5'.

Figure 4:
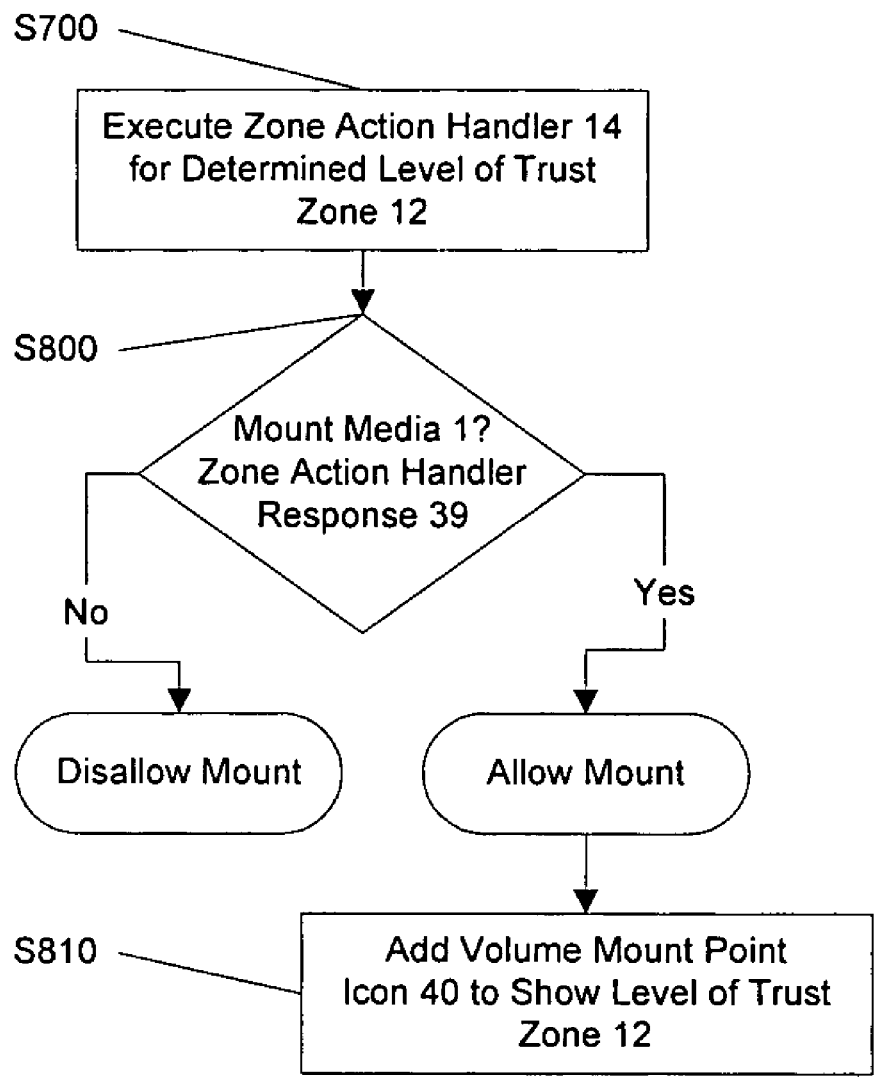
FIG. 4 is a flow-chart view of the graphic identification steps.

FIG. 4 illustrates an optional step of alerting the user that a volume mount has been authenticated by the Volume Trust application. Zone Action Handler 14 returns Zone Action Handler Response 39 to allow mount of media 1 or disallow mount of media 1, step S800. If the mount is allowed, a volume mount point icon 40 is displayed or otherwise communicated, reflecting the Level of Trust Zone for which the mount was allowed. This alerts the user of the trust level circumstances which allowed media 1 or media device 2 to be mounted. This icon or communication may be used by the operating system, throughout the operating system application dialogs, to denote the Level of Trust Zone.

Figure 5:
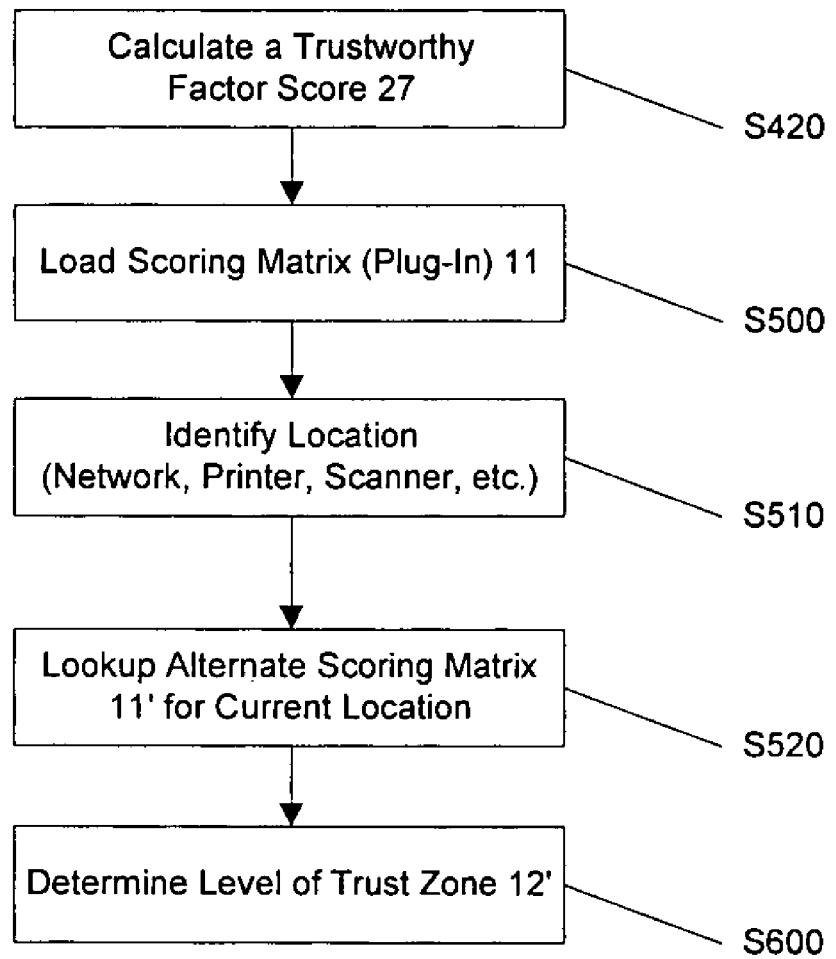
FIG. 5 is a flow-chart view of dynamic adjustment of the scoring matrix, based on the perceived location of the computing device.

FIG. 5 illustrates use of the device connection information to guide dynamic adjustment of scoring matrix 11. Trustworthy Factor Calculator 9 returns Trustworthy Factor Score 27, step 420. The initial scoring matrix 11 is loaded, step S500. Devices connected to computing device 3 (such as network connections, printers, media devices) are identified, step S510, establishing a perceived location for computing device 3. For example, it may be found that computing device 3, say a laptop computer, is connected to a wireless network at a remote location rather than docked to a high-security network inside an office at a fixed location. Adjustments to the scoring matrix 11 are selected from one or more alternate scoring matrices 11', based on the perceived location of computing device 3, step S520. Continuing with the laptop computer example, scoring matrix 11 may be adjusted, or an alternate scoring matrix 11' loaded, to reflect a higher score requirement in order to produce a mount authentication. The Level of Trust Zone 12' is determined by comparing the Trustworthy Factor Score 27 to the adjusted scoring matrix 11', step S600.

FIG. 6 illustrates use of device connection information to guide dynamic adjustment of the Trustworthy Factor Calculator. Trustworthy Factor Calculator 9 is loaded, step S300. Devices connected to computing device 3 are identified, step S310. Based on the perceived identified location, the appropriate calculation steps 22 to use are selected, step S320. For example, it may be found that computing device 3, say a laptop computer, is connected to a wireless network at a remote location rather than docked to a high-security network inside an office at a fixed location. This means that calculation steps 22, one for remote wireless operation, are required. Calculation steps 22 are loaded, step S330. Trustworthy Factor Calculator 9 then loads weighing factors 23 which have been previously determined for the media 1 and media device 2 undergoing authentication, step S350.

Figure 7:
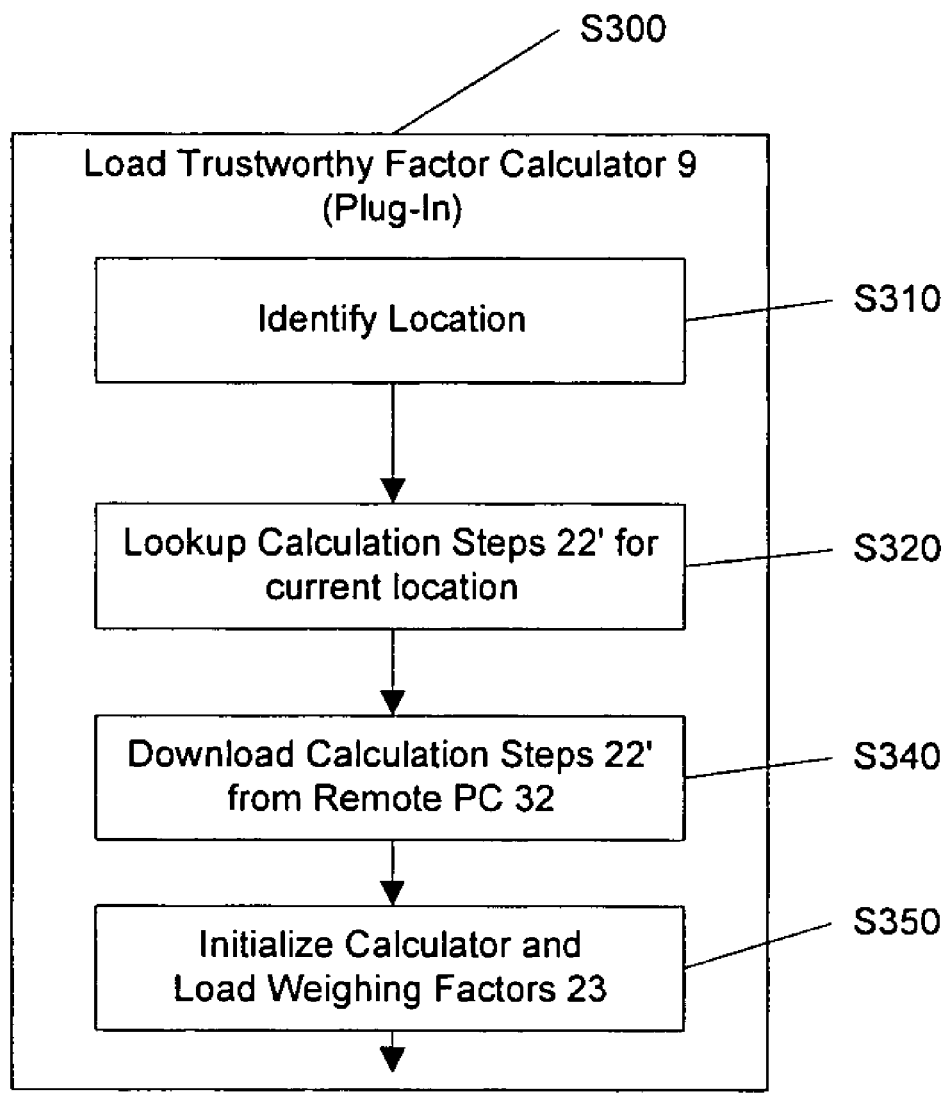
FIG. 7 is a flow-chart view of remotely accessed dynamic adjustment of the calculating steps of the Trustworthy Factor Calculator, based on the perceived location of the computing device.

FIG. 7 illustrates use of device connection information to guide dynamic adjustment of Trustworthy Factor Calculator 9, where calculation steps 22' are obtained from a remote location 32, such as over a network or the internet. Trustworthy Factor Calculator 9 is loaded, step S300. Devices connected to computing device 3 are identified, step S310. Based on the perceived identified location, the appropriate calculation steps 22' to use are selected, step S320. For example, it may be found that computing device 3, say a laptop computer, is connected to a wireless network at a remote location rather than docked to a high-security network inside an office at a fixed location. This means that calculation steps 22', one for remote wireless operation, are required. For very high security situations, it may be required that calculation steps 22' may not be obtained from computing device 3, rather must be downloaded from a specific secure remote location. Calculation steps 22' are loaded from a remote location, step S340. Trustworthy Factor Calculator 9 then loads weighing factors 23 which have been previously determined for the media 1 and media device 2 undergoing authentication, step S350.

Figure 8:
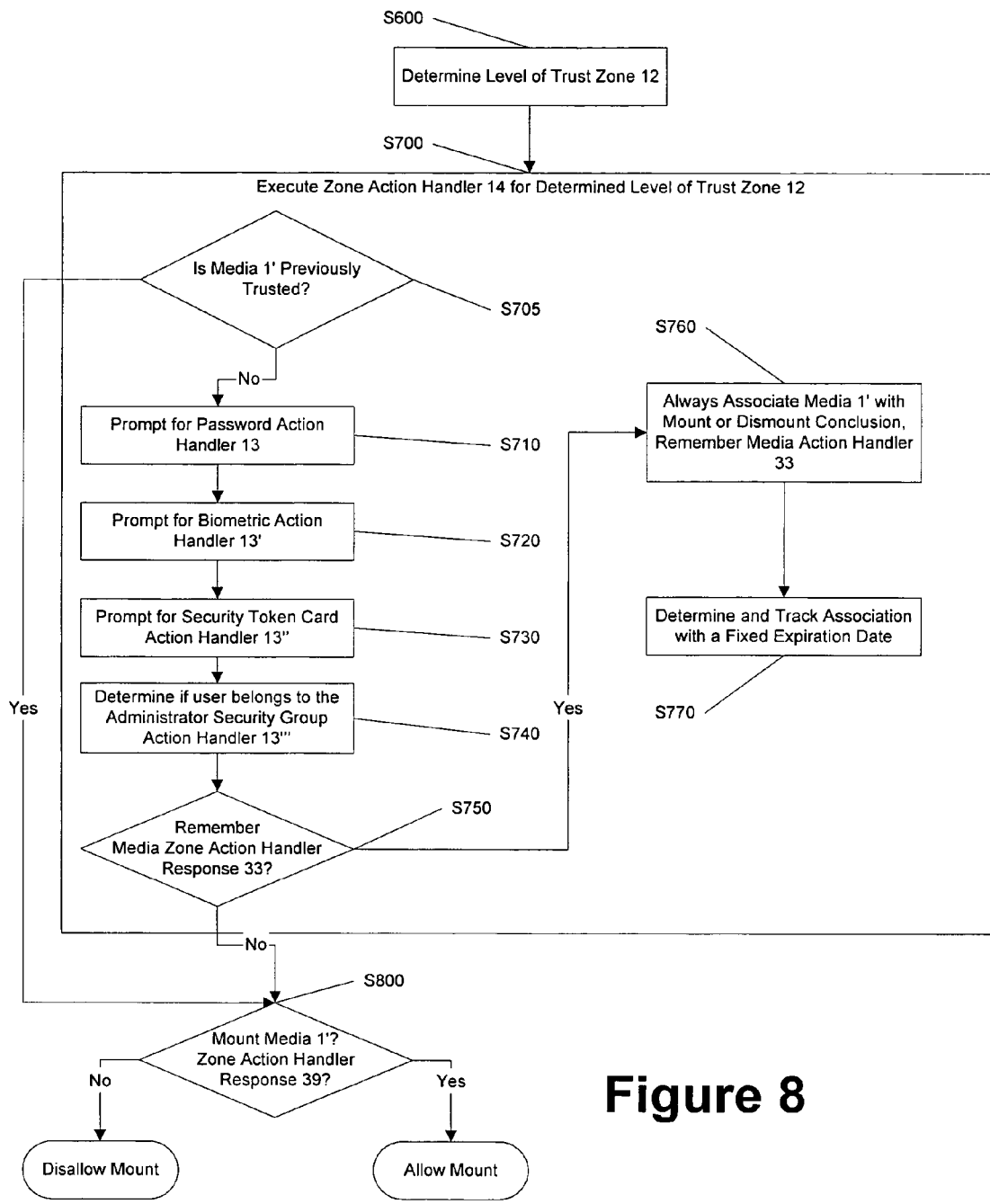
FIG. 8 is a flow-chart view of the authentication steps.

FIG. 8 illustrates various details of the authentication process, including actions for external additional authentication, which may be called upon by a selected Zone Action Handler. Scoring matrix 11 is used to convert Trustworthy Factor Score 27 into Level of Trust Zone 12, step S600. Based on Level of Trust Zone 12, Zone Action Handler 14 is selected, step S700. Note, that Zone Action Handler 14 may in practice embody one or more action handlers 13, each of which performs particular tasks. Zone Action Handler 14 refers to the collective actions of all action handlers 13. Zone Action Handler 14 may return a response that recommends or directs computing device 3 to disallow the mounting of media 1, may require specific authentication action to take place prior to allowing a mount of media 1, or may indicate that media 1 may be mounted without further authentication. For instance, one action handler 13 may prompt the user for a password, step S710, then call a second action handler 13' to prompt for biometric information, step S720, which in turn calls a third action handler 13" to prompt for a security token card, step S730, then calling a fourth action handler 13'" to determine whether the user belongs to an administrative security group, step S740. Each of these action handlers 13, 13', 13", 13'" returns a response. Various other authentication steps, now known or to be developed, may be programmed into a Zone Action Handler 14 or its action handlers 13. Upon completion of execution of Zone Action Handler 14, a Zone Action Handler Response 39 is returned and a decision to allow or disallow the mount is made, step S800.

In an alternative embodiment, Zone Action Handler 14 may include the capability to decide whether to remember the external additional authentication for the particular media or media device being authenticated, step S750. In such case, Zone Action Handler 14 includes a Remember Media Action Handler 33, which may be configured to always associate the particular media 1' with a mount or dismount conclusion, step S760. Such being the case, the next time that particular media 1' is subject to an authentication request, another action handler, the Media Previously Trusted Action Handler 34, may directly return a mount or dismount conclusion without invoking other action handlers to prompt for password, biometrics, security token card, or administrator security group determination, step S705. An additional alternate embodiment is to enable the Remember Media Action Handler 33 to grant such mount or dismount association for a fixed period of time, or other validity condition, step S770. In such case, Media Previously Trusted Action Handler 34 uses the period of time or other validity condition in making its mount or dismount conclusion.

Figure 9:
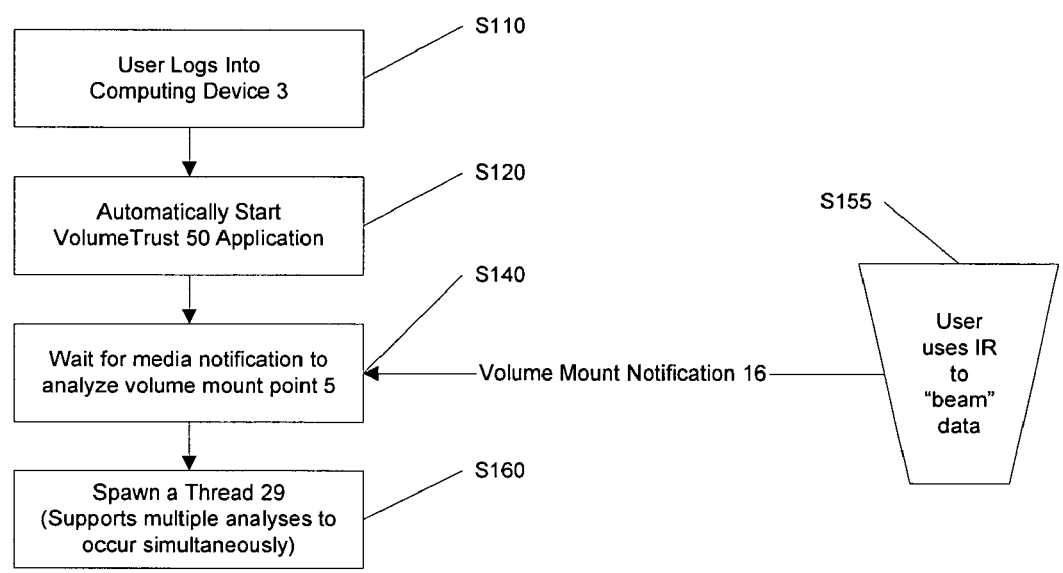
FIG. 9 is a flow-chart view of the volume mount point steps.

FIG. 9 illustrates volume mount point steps. Typically, a user logs into computing device 3, step S110. Typically, application Volume Trust 50 is started automatically, step S120. Application Volume Trust 50 polls or waits for notification to analyze a volume mount point 5, step S140. A notification may occur when a device beams an infrared or wireless signal to the computing device or a device attached to the computing device, step S155. Application Volume Trust 50 spawns thread 29, step S160, to begin the volume mount authentication process.

Figure 10:
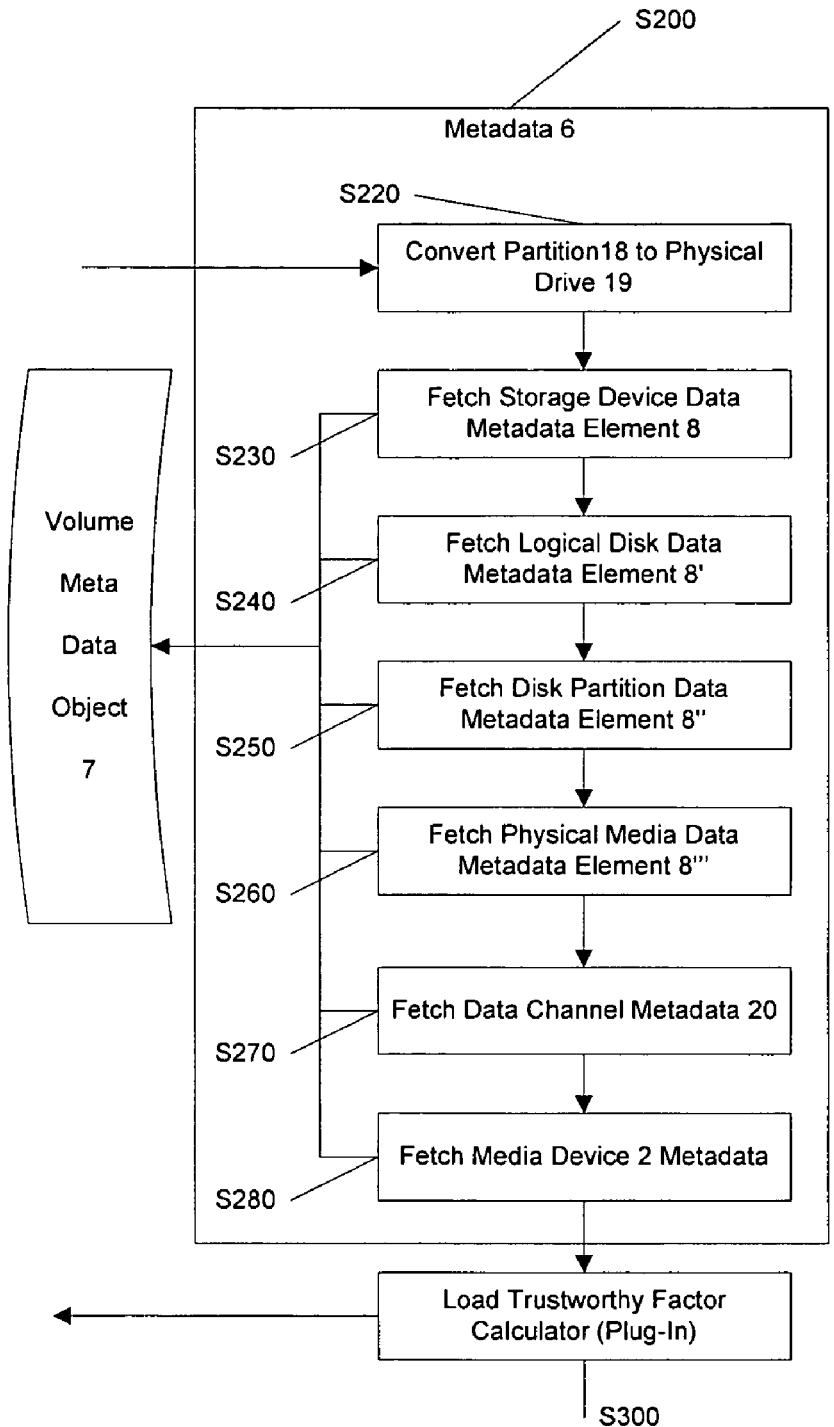
FIG. 10 is a flow-chart view of the metadata extraction steps.

FIG. 10 illustrates various details of the metadata extraction process. Partition information 18 is converted into physical drive information 19, step S220. Once the physical drive information 19 is obtained, the storage device data is extracted, step S230, along with logical disk data, step S240, disk partition data, step S250, and physical media data, step S260, as is appropriate for the media being authenticated. Additionally, it is optionally possible to obtain data associated with the data communications channel 20, step S270, and the media device 2 itself, including its hosted computing device, if one exists, step S280. The collected metadata 6 is stored as a volume metadata object 7, composed of metadata elements 8. The Trustworthy Factor Calculator is loaded, step S300.

An alternate embodiment of the present invention includes use of external reporting of security levels to adjust the scoring matrix. A governmental agency, an industry, a specific plant or locale may issue security alerts of various levels. For example, a refinery may receive "red", "orange", "yellow", and "green" security levels, depending on external intelligence, terrorist action, or geopolitical conditions. These external security levels may be used to automatically modify the scoring matrix. In this example, a "red" or "orange" security level, indicating a threatening security condition, may be used to require greater trustworthy factor scores to meet specific level of trust zone thresholds. In such case, the external security levels are used as indicators to adjust or replace the scoring matrix to reflect these more stringent security requirements.

Although the description above contains many specifications, these should not be construed as limiting the scope of the invention but as merely providing illustrations of some of the presently preferred embodiments of this present invention. Persons skilled in the art will understand that the method and apparatus described herein may be practiced, including but not limited to, the embodiments described. Further, it should be understood that the invention is not to be unduly limited to the foregoing which has been set forth for illustrative purposes. Various modifications and alternatives will be apparent to those skilled in the art without departing from the true scope of the invention. While there has been illustrated and described particular embodiments of the present invention, it will be appreciated that numerous changes and modifications will occur to those skilled in the art, and it is intended as herein disclosed to cover those changes and modifications which fall within the true spirit and scope of the present invention.

I claim:

1. A method for authenticating computer media for communication with a computing device, comprising the steps of:
   a) detecting a media volume mount point;
   b) deabstracting a logical address of said media volume mount point into a physical disk partition address;

c) deabstracting said physical disk partition address into a physical storage device address;

d) receiving a plurality of metadata elements from data structures associated with one or more components from the list comprising: said computer media, said physical storage device address, said physical disk partition address, a data communications channel, and said media volume mount point;

e) loading a trustworthy factor calculator wherein said trustworthy factor calculator comprises calculation steps producing score values and maximum possible score values associated with said metadata elements;

f) initializing said trustworthy factor calculator with a matrix of weighing factors associated with said plurality of metadata elements;

g) accumulating a raw score based on said score values for said plurality of metadata elements, wherein each score value used in said accumulation of said raw score is adjusted by said associated weighing factors, accumulating an overall maximum possible score for said maximum possible score values, wherein each maximum possible score value used in said accumulation of said overall maximum score is adjusted by said associated weighing factors, normalizing said raw score with said overall maximum score, whereby a trustworthy factor score is produced;

h) initializing said trustworthy factor calculator with a scoring matrix having discrete level of trust zone values associated with trustworthy factor scores;

i) comparing said trustworthy factor score with said scoring matrix, whereby a level of trust zone value is produced;

j) executing at least one zone action handler based on said level of trust zone value, said zone action handler returning at least one zone action handler response; and k) determining whether said volume mount point authentication should be permitted or denied based on the result of said zone action handlers response.

2. The method as claimed in claim 1 wherein said detecting a media volume mount point comprises detecting existing volume mount points recognized by the computing device.

3. The method as claimed in claim 1 further comprising the step of communicating said level of trust zone value to said computing device.

4. The method as claimed in claim 1 further comprising the step of communicating said level of trust zone value to an operating system of said computing device.

5. The method as claimed in claim 1 further comprising the step of communicating said level of trust zone value to a user of said computing device.

6. The method as claimed in claim 1 wherein said trustworthy factor calculator loads calculation steps from a remote location.

7. The method as claimed in claim 1 wherein said trustworthy factor calculator loads calculation steps locally from said computing device.

8. The method as claimed in claim 1 further comprising the steps of:

a) identifying devices connected to said computing device; and b) loading alternate calculation steps producing score values and maximum possible score values associated with said metadata elements, said alternate loading based on the results of said identifying of devices connected to said computing device.

9. The method as claimed in claim 8 wherein said alternate calculation steps are loaded from said computing device.

10. The method as claimed in claim 8 wherein said alternate calculation steps are loaded from a remote location.

11. The method as claimed in claim 1 further comprising the steps of:

a) identifying devices connected to said computing device; and b) adjusting said scoring matrix based upon the results of said identification of devices connected to said computing device.

12. The method as claimed in claim 11 wherein said adjustments to said scoring matrix are loaded from a remote location.

13. The method as claimed in claim 11 wherein said adjustments to said scoring matrix are loaded from said computing device.

14. The method as claimed in claim 1 wherein said scoring matrix having discrete level of trust zone values is loaded from said computing device.

15. The method as claimed in claim 1 wherein said scoring matrix having discrete level of trust zone values is loaded from a remote location.

16. The method as claimed in claim 1 wherein said execution of a zone action handler comprises the step of requiring specific authentication action.

17. The method as claimed in claim 1 wherein said execution of a zone action handler further comprises the step of determining whether the user belongs to a particular group.

18. The method as claimed in claim 1 wherein said execution of a zone action handler further comprises the step of determining whether the user belongs to an administrative security group.

19. The method as claimed in claim 1 wherein said execution of a zone action handler comprises the step of prompting the user for a password.

20. The method as claimed in claim 1 wherein said execution of a zone action handler comprises the step of prompting for biometric information.

21. The method as claimed in claim 1 wherein said execution of a zone action handler comprises the step of prompting a security token card.

22. The method as claimed in claim 1 wherein said execution of at least one of said zone action handler comprises the step of recording said zone action handler responses for said computer media undergoing authentication.

23. The method as claimed in claim 22, wherein said recording of zone action handler responses is made on said computing device.

24. The method as claimed in claim 22, wherein said recording of zone action handler responses is made on said computer media undergoing authentication.

25. The method as claimed in claim 1, wherein said execution of at least one of said zone action handler comprises the step of recording a validity condition.

26. The method as claimed in claim 25, wherein said recording of said validity condition is made on said computing device.

27. The method as claimed in claim 25, wherein said recording of said validity condition is made on said computer media undergoing authentication.

28. The method as claimed in claim 1, wherein said execution of at least one of said zone action handler comprises the step of recording a validity period of time.

29. The method as claimed in claim 28, wherein said recording of said validity period of time is made on said computing device.

30. The method as claimed in claim 28, wherein said recording of said validity period of time is made on said computer media undergoing authentication.

31. The method as claimed in claim 1 wherein said execution of at least one of said zone action handler comprises the steps of:
   a) detecting a recorded zone action handler response; and
   b) returning a zone action handler response, based upon said recorded zone action handler response.

32. The method as claimed in claim 1 wherein said execution of at least one of said zone action handler comprises the steps of:
   a) detecting a recorded validity condition;
   b) testing for said validity condition; and
   c) returning a zone action handler response, based upon said testing of said validity condition.

33. The method as claimed in claim 1 wherein said execution of at least one of said zone action handler comprises the steps of:
   a) detecting a recorded validity period of time;
   b) obtaining a present time;
   c) determining whether said present time is within said validity period of time; and
   d) returning a zone action handler response, based upon said determination.

34. The method as claimed in claim 1 wherein said computing device communicates with said media through at least one communications channel.

35. The method as claimed in claim 34, further comprising the step of receiving a plurality of metadata elements from data structures associated with said communications channel.

36. The method as claimed in claim 1, further comprising the step of receiving a plurality of metadata elements from data structures associated with devices abstracted behind said media volume mount point.

37. The method as claimed in claim 1 further comprising the steps of:
   a) identifying an external security level indicator; and
   b) adjusting said discrete level of trust zone values associated with trustworthy factor scores, based on the results of said identification of external security level.

* * * * *